US009664218B2

(12) United States Patent
Ito

(10) Patent No.: US 9,664,218 B2
(45) Date of Patent: May 30, 2017

(54) CONNECTOR

(71) Applicant: Japan Aviation Electronics Industry, Limited, Tokyo (JP)

(72) Inventor: Yasukazu Ito, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 287 days.

(21) Appl. No.: 14/435,521

(22) PCT Filed: Sep. 25, 2013

(86) PCT No.: PCT/JP2013/075793
§ 371 (c)(1),
(2) Date: Apr. 14, 2015

(87) PCT Pub. No.: WO2014/077035
PCT Pub. Date: May 22, 2014

(65) Prior Publication Data

US 2015/0275948 A1 Oct. 1, 2015

(30) Foreign Application Priority Data

Nov. 13, 2012 (JP) ................................ 2012-249661

(51) Int. Cl.
*H01R 13/639* (2006.01)
*F16B 9/02* (2006.01)
*H01R 11/28* (2006.01)

(52) U.S. Cl.
CPC ................ *F16B 9/02* (2013.01); *H01R 11/28* (2013.01); *H01R 13/639* (2013.01); *Y10T 403/32237* (2015.01)

(58) Field of Classification Search
CPC .. H01R 13/639; H01R 13/6277; H01R 11/28; H01R 11/282
See application file for complete search history.

(56) References Cited

U.S. PATENT DOCUMENTS 2,196,717 A * 4/1940 Wright ................. H01R 11/282 439/761
4,623,212 A * 11/1986 Hogan, Sr. ........... H01R 11/282 439/200

(Continued)

FOREIGN PATENT DOCUMENTS

CN 1275252 A 11/2000
CN 201536188 U 7/2010

(Continued)

OTHER PUBLICATIONS

Chinese Office Action in CN 201380054852.2, dated Jun. 28, 2016, with English translation.

(Continued)

*Primary Examiner* — Daniel Wiley
(74) *Attorney, Agent, or Firm* — Collard & Roe, P.C.

(57) ABSTRACT

A connector is capable of being fitted to, and extracted from, a partner-side structure along the vertical direction. The partner-side structure is provided with a lock housing extending upwards. The connector is provided with a housing, and an operation member formed separately from the housing. The operation member is capable of rotating, about a rotary axis parallel to the vertical direction, between a release position and a lock position. A locked section protruding in the radial direction orthogonal to the rotary axis is provided to the operation member. The locked section allows the connector to be fitted to, and extracted from, the partner-side structure when the operation member is at the release position. The locked section interferes with the lock housing and prevents the connector from being fitted to, and extracted from, the partner-side structure when the operation member is at the lock position.

9 Claims, 11 Drawing Sheets

(56) References Cited

U.S. PATENT DOCUMENTS

| | | | | |
|---|---|---|---|---|
| 5,024,619 | A * | 6/1991 | Caraballo | H01R 11/282 439/755 |
| 5,588,883 | A | 12/1996 | Hattori | |
| 5,921,794 | A | 7/1999 | Koch | |
| 6,030,722 | A | 2/2000 | Kuboshima et al. | |
| 6,136,465 | A | 10/2000 | Kuboshima et al. | |
| 6,183,904 | B1 | 2/2001 | Kuboshima et al. | |
| 6,544,062 | B1 | 4/2003 | Loveless et al. | |
| 6,918,780 | B1 * | 7/2005 | Yang | H01R 13/639 439/346 |
| 7,156,682 | B1 * | 1/2007 | Lai | H01R 13/639 439/270 |
| 7,344,421 | B1 * | 3/2008 | Spencer | H01R 11/282 439/286 |
| 8,608,506 | B2 * | 12/2013 | Zhao | H01R 13/6277 439/522 |

FOREIGN PATENT DOCUMENTS

| | | | |
|---|---|---|---|
| CN | 202444121 | U | 9/2012 |
| CN | 102769236 | A | 11/2012 |
| EP | 2290752 | A | 3/2011 |
| GB | 2016823 | A | 9/1979 |
| JP | H07-335193 | A | 12/1995 |
| JP | H09-330698 | A | 12/1997 |
| JP | 2001-266844 | A | 9/2001 |
| JP | 2009-252457 | A | 10/2009 |

OTHER PUBLICATIONS

International Search Report of PCT/JP2013/075793, mailed Nov. 19, 2013.

* cited by examiner

CONNECTOR

CROSS REFERENCE TO RELATED APPLICATIONS

This application is the National Stage of PCT/JP2013/075793 filed on Sep. 25, 2013, which claims priority under 35 U.S.C. §119 of Japanese Application No. 2012-249661 filed on Nov. 13, 2012, the disclosure of which is incorporated by reference. The international application under PCT article 21(2) was not published in English.

TECHNICAL FIELD

This invention relates to a connector which is mateable with and removable from a mating structure comprising a pin contact and a lock housing.

BACKGROUND ART

For example, this type of connector is disclosed in Patent Document 1.

As shown in FIGS. 20A and 20B, a female connector (connector) disclosed in Patent Document 1 is mateable with and removable from a mating structure, which is formed on a battery body, along a mating direction. The mating structure is formed of a male terminal (pin contact) and a lock rib (lock housing) which are attached to an upper surface of the battery body. The connector comprises a housing and a female terminal (contact) held by the housing. The housing is provided with a bendable arm (resilient piece) having a lock projection. The bendable arm is provided on a periphery of the housing. The lock projection is supported to be movable in a lateral direction perpendicular to the mating direction. When the connector is mated with the mating structure, the lock projection is locked by the lock rib so that the connector is prevented from being unintentionally removed. The connector under a mated state, or the connector mated with the mating structure, can be removed from the mating structure by moving the lock rib toward the center of the housing in the lateral direction.

PRIOR ART DOCUMENTS

Patent Document(s)

Patent Document 1: JP B 3204918

SUMMARY OF INVENTION

Technical Problem

The lock projection of Patent Document 1 is formed to be relatively easily moved in the lateral direction in order to enable the connector to be mated with and removed from the mating structure. As a result, if the connector mated with the mating structure receives an upward strong force, or such force that forces the connector to be removed, the lock projection might be moved so that the connector is removed. The connector of Patent Document 1 easily comes off the mating structure, for example, when the connector is swayed.

It is therefore an object of the present invention to provide a connector which is mateable with and removable from a mating structure comprising a pin contact and a lock housing and which can be more securely prevented from being unintentionally removed from the mating structure.

Solution to Problem

An aspect of the present invention provides a connector mateable with and removable from a mating structure along an upper-lower direction. The mating structure has an upper surface and comprises a pin contact and a lock housing which extend upward along the upper-lower direction from the upper surface. The connector comprises a housing, a contact and an operation member. The contact is held by the housing. The contact is brought into contact with the pin contact under a mated state where the connector and the mating structure are mated with each other. The operation member is formed separately from the housing and supported by the housing. The operation member is rotationally movable between a release position and a lock position about a pivot axis which is in parallel to the upper-lower direction. The operation member is provided with a locked portion projecting in a radial direction perpendicular to the pivot axis. The locked portion allows the connector to be moved to the mated state with the mating structure and to be removed from the mating structure when the operation member is located at the release position. The locked portion interferes with the lock housing when the operation member is located at the lock position, so that the locked portion prevents the connector from being moved to the mated state with the mating structure and from being removed from the mating structure.

Advantageous Effects of Invention

According to the present invention, when the operation member of the connector is rotationally moved from the release position to the lock position, the connector mated with the mating structure is prevented from being removed. Accordingly, the connector can be more securely prevented from being unintentionally removed.

An appreciation of the objectives of the present invention and a more complete understanding of its structure may be had by studying the following description of the preferred embodiment and by referring to the accompanying drawings.

DESCRIPTION OF EMBODIMENTS

Figure 1:
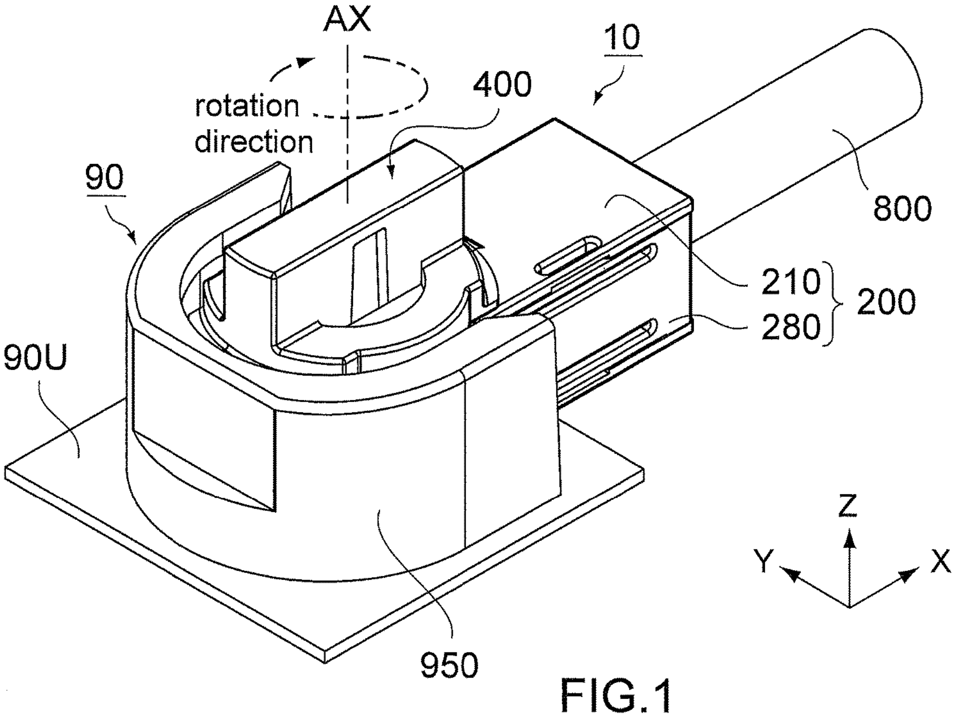
FIG. 1 is a perspective view showing a connector and a mating structure according to an embodiment of the present invention, wherein the connector and the mating structure are mated with each other, and an operation member of the connector is located at a release position.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figure 2:
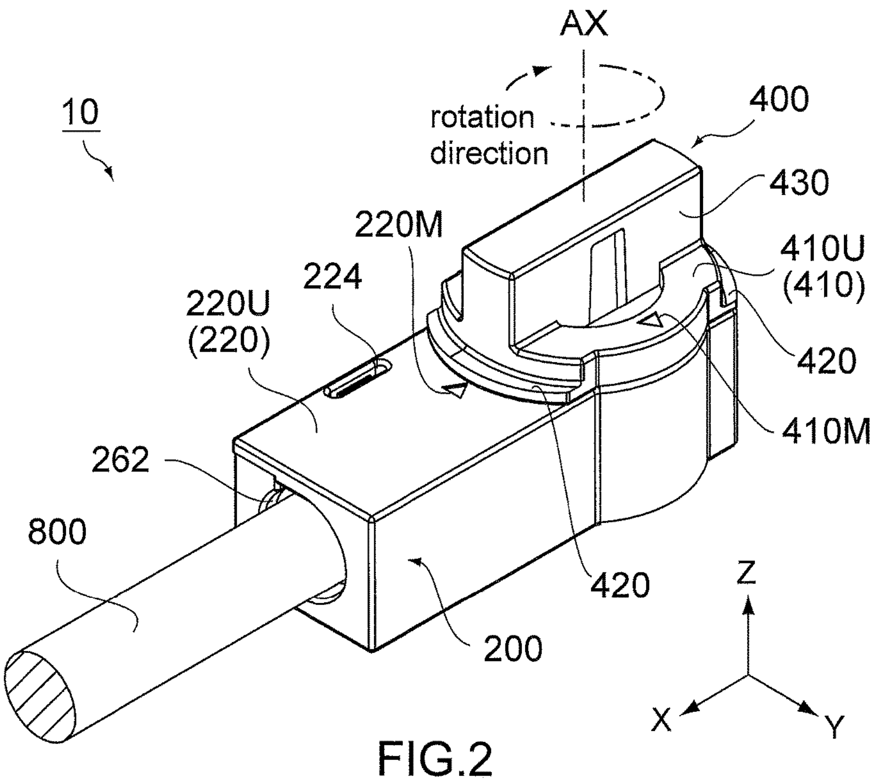
FIG. 2 is a perspective view showing the connector of FIG. 1.
Figure 3:
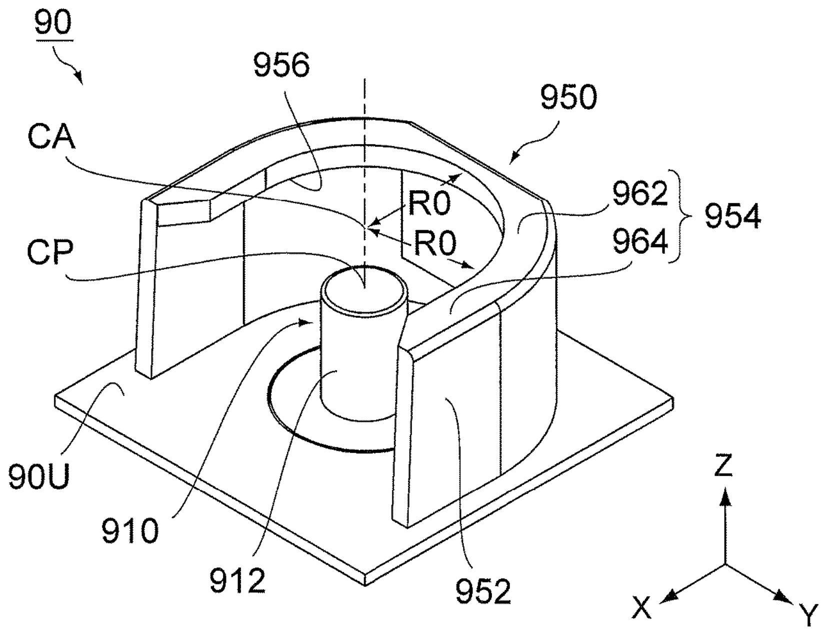
FIG. 3 is a perspective view showing the mating structure of FIG. 1.

As can be seen from FIGS. 1 to 3, the connector 10 according to an embodiment of the present invention is a cable connector which is mateable with and removable from a mating structure 90 along an upper-lower direction (Z-direction). In detail, the connector 10 can be mated with the mating structure 90, which is located below, by being moved downward, or along the negative Z-direction. The connector 10 mated with the mating structure 90 is in a mated state. The connector 10 in the mated state can be removed from the mating structure 90 by being moved upward, or along the positive Z-direction. In other words, according to the present embodiment, the mating direction is the negative Z-direction, and the removal direction is the positive Z-direction.

Figure 4:
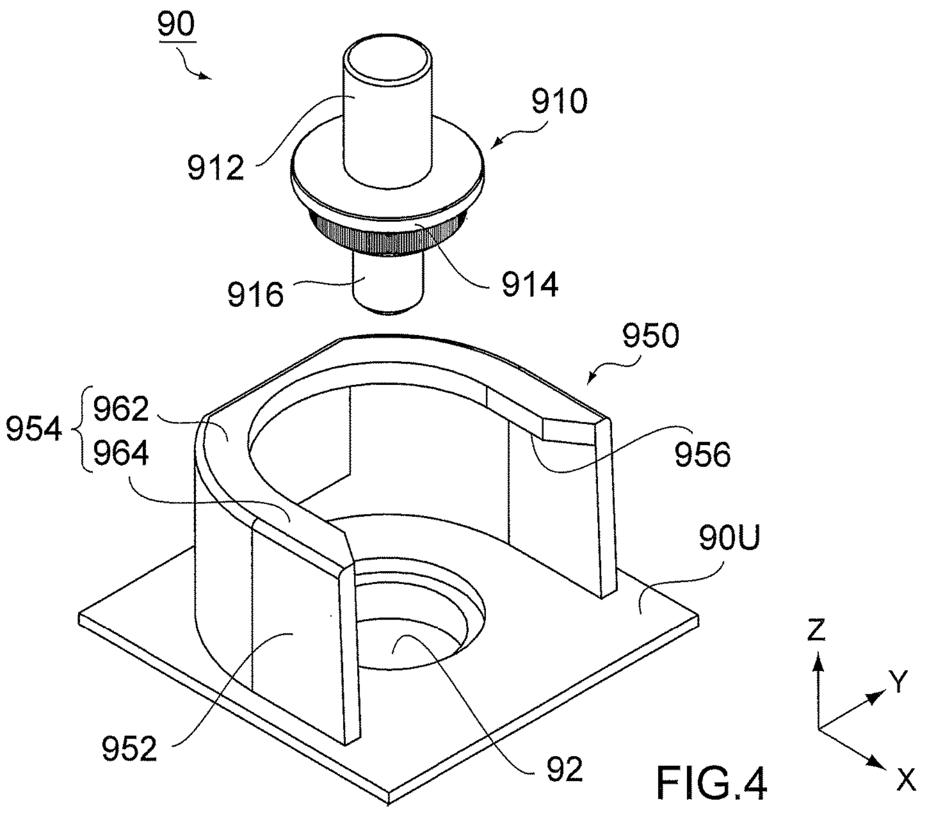
FIG. 4 is an exploded, perspective view showing the mating structure of FIG. 3.

As shown in FIGS. 1, 3 and 4, the mating structure 90 has an upper surface 90U which is insulated. Moreover, the mating structure 90 comprises a pin contact 910 made of conductor and a lock housing 950 made of insulator. The pin contact 910 and the lock housing 950 extend upward along the Z-direction from the upper surface 90U. The upper surface 90U according to the present embodiment is a part of an upper surface, or the positive Z-side surface, of a battery body (not shown). The pin contact 910 according to the present embodiment is connected to the battery body. The pin contact 910 is used to charge electric power supplied via the connector 10 to the battery body, or used to supply the electric power charged in the battery body to a device (not shown) connected to the connector 10. In other words, according to the present embodiment, the connector 10 is a power connector, and the pin contact 910 is a power contact. However, the present invention is also applicable to a connector other than the power connector.

As shown in FIG. 4, the upper surface 90U is formed with a holding hole 92. As can be seen from FIGS. 3 and 4, the pin contact 910 is held in the holding hole 92 so as to extend in the Z-direction. In detail, as shown in FIG. 4, the pin contact 910 has a contact portion 912, a held portion 914 and a connection portion 916. The connection portion 916 is inserted into the holding hole 92 and is electrically connected with the battery (not shown). The held portion 914 is held by the holding hole 92 so that the contact portion 912 extends upward from the upper surface 90U (see FIG. 3). The contact portion 912 according to the present embodiment has a columnar shape. Accordingly, the contact portion 912 has an upper end, or the positive Z-side end, which is formed in a planar shape perpendicular to the Z-direction.

The lock housing 950 according to the present embodiment is provided so as to be around the pin contact 910. In detail, the lock housing 950 is provided with a sidewall 952 and a lock wall 954. The sidewall 952 extends upward from the upper surface 90U. The sidewall 952 covers opposite sides of the pin contact 910 in a width direction (Y-direction) and a front side, or the negative X-side, of the pin contact 910 in a front-rear direction (X-direction). The lock wall 954 is formed at an upper end of the sidewall 952. The lock wall 954 is located above the pin contact 910 in the Z-direction. In addition, the lock wall 954 protrudes from the sidewall 952 toward the pin contact 910 in the XY-plane. Since the lock housing 950 is formed as described above, electrical shock due to contact with the pin contact 910 can be prevented.

The lock wall 954 according to the present embodiment is formed of one arcuate portion 962 and two linear portions 964. The arcuate portion 962 according to the present embodiment has a semicircular shape in a plane perpendicular to the Z-direction, or in the XY-plane that is a horizontal plane. However, the arcuate portion 962 may have any arc shape different from the semicircular shape, for example, one-third circle shape. The arcuate portion 962 is formed so as to project forward, or in the negative X-direction. The linear portions 964 extend rearward, or in the positive X-direction, from two rear ends, or the positive X-side ends, of the arcuate portions 962 in the X-direction, respectively.

As can be seen from FIG. 3, the arcuate portion 962 according to the present embodiment is formed to be apart from the center (CP) of the columnar shape of the contact portion 912 of the pin contact 910 by a predetermined distance (R0). In other words, according to the present embodiment, the center (CA) of the arcuate portion 962 is located at a position same as that of the center (CP) of the pin contact 910 in the XY-plane. However, the center (CA) of the arcuate portion 962 may be apart from the center (CP) of the pin contact 910.

Figure 15:
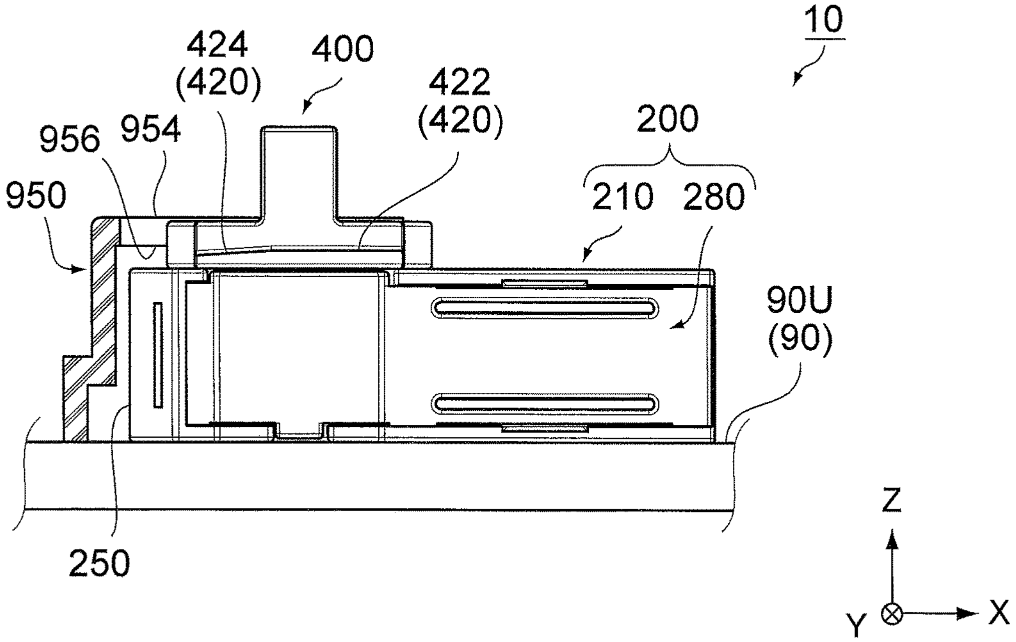
FIG. 15 is a side view showing the connector and the mating structure of FIG. 14, wherein the mating structure is indicated by a cross-section of a lock housing taken along line XV-XV.

As can be seen from FIGS. 3, 4 and 15, the lock wall 954 has a lower surface, or the negative Z-side surface. The lower surface of the lock wall 954 is formed with lock portions 956. The lock portion 956 according to the present embodiment is a plane which is formed mainly on a lower side, or the negative Z-side, of the linear portion 964 and is perpendicular to the Z-direction. However, the lock portion 956 may be oblique to the Z-direction. Moreover, the lock portion 956 may be a curved surface which intersects with the Z-direction.

Figure 5:
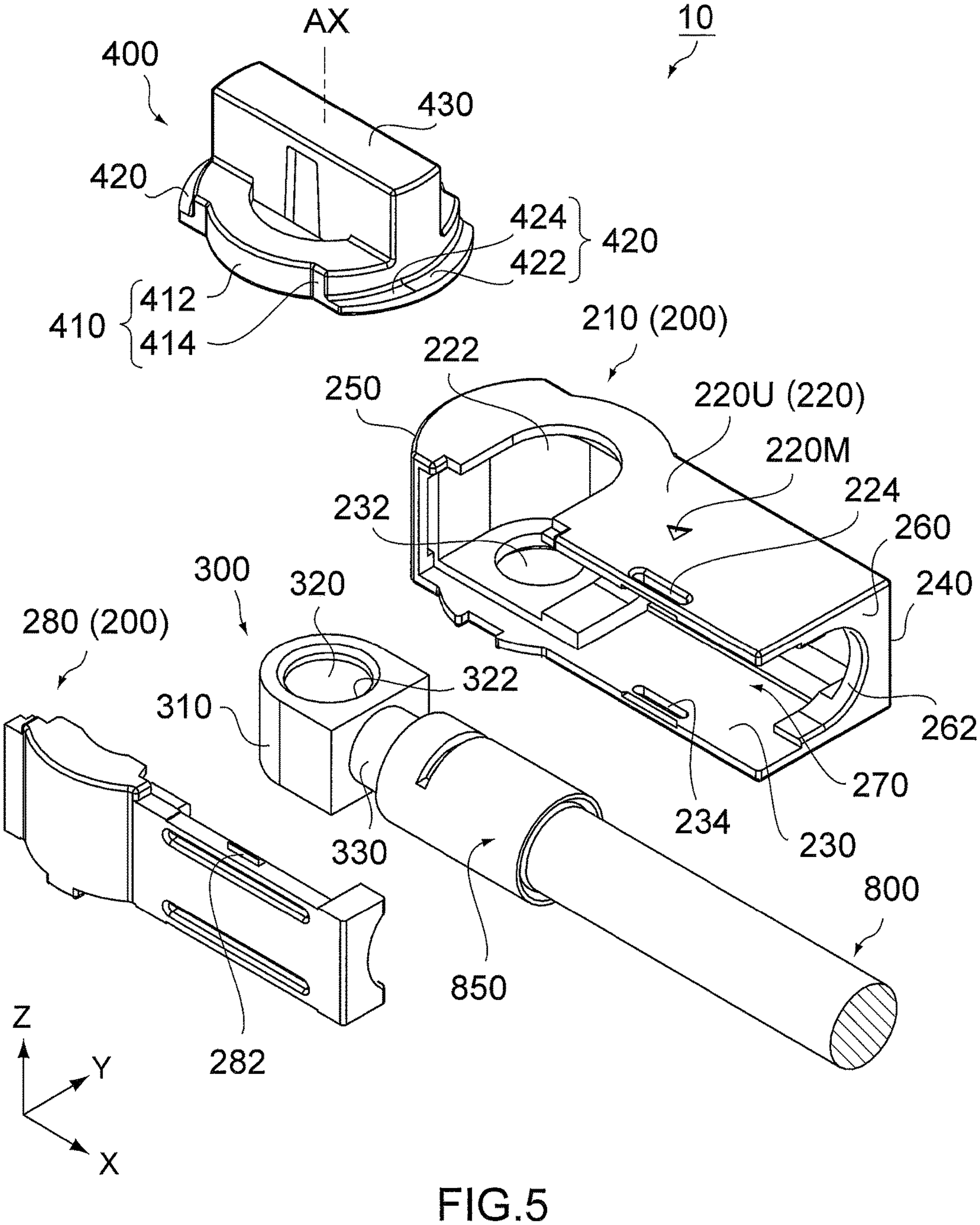
FIG. 5 is an exploded, perspective view showing the connector of FIG. 2.

As shown in FIG. 5, the connector 10 comprises a housing 200 made of insulator, a contact 300 made of conductor and an operation member 400 made of insulator. The operation member 400 is formed separately from the housing 200. The housing 200 according to the present embodiment consists of a first member 210 and a second member 280. However, the housing 200 may further comprise the other members.

As shown in FIG. 5, the first member 210 has an upper plate 220, a bottom plate 230 and a side plate 240. In addition, the first member 210 is formed with an accommodation portion 270 to accommodate the contact 300. In detail, the upper plate 220 and the bottom plate 230 are located at opposite ends of the housing 200 in the Z-direction, respectively. The side plate 240 is formed at one of opposite ends of the housing 200 in the Y-direction. The side plate 240 according to the present embodiment is located at the positive Y-side end of the housing 200. The side plate 240 couples the upper plate 220 and the bottom plate 230 to each other in the Z-direction. The accommodation portion 270 is a space surrounded by the upper plate 220, the bottom plate 230 and the side plate 240. In other words, the upper plate 220, the bottom plate 230 and the side plate 240 form the accommodation portion 270.

The upper plate 220 has an upper surface 220U in parallel to the XY-plane. The upper surface 220U is formed with a positioning mark 220M. The positioning mark 220M according to the present embodiment has a triangular shape. The upper plate 220 is formed with a support hole 222 and an engagement hole 224. The support hole 222 is formed so as to partially cut out a front part, or the negative X-side part, of the upper plate 220 from the negative Y-side thereof. More specifically, the support hole 222 is a combination of a semicircular hole (a semicircular portion) and a rectangular cutout. The engagement hole 224 is a hole formed at the negative Y-side end of the upper plate 220. The engagement hole 224 extends long in the X-direction while piercing the upper plate 220 in the Z-direction.

The bottom plate 230 is formed with an insertion hole 232 and an engagement hole 234. The insertion hole 232 is a circular hole piercing the bottom plate 230 in the Z-direction. In the XY-plane, the insertion hole 232 is slightly larger than the contact portion 912 (see FIG. 3) of the pin contact 910. In the XY-plane, the center of the insertion hole 232 is located at a position same as that of the center (CP) (see FIG. 3) of the contact portion 912 under the mated state. Moreover, in the XY-plane, the center of the insertion hole 232 is apart from the center of the semicircular portion of the support hole 222 (see FIG. 17). The engagement hole 234 is a hole which is formed at the negative Y-side end of the bottom plate 230 so as to correspond to the engagement hole 224 of the upper plate 220. The engagement hole 234 extends long in the X-direction while piercing the bottom plate 230 in the Z-direction.

Figure 17:
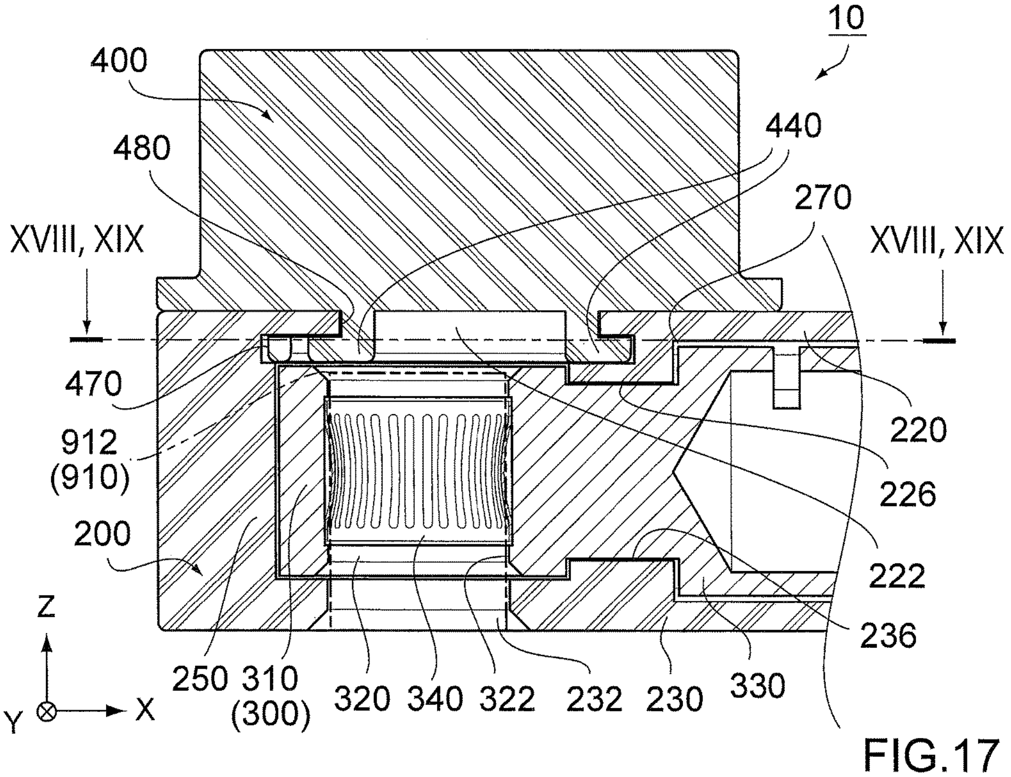
FIG. 17 is a partial, cross-sectional view showing the connector of FIG. 12 taken along line XVII-XVII, wherein the mating structure is not illustrated except a schematic shape of the pin contact.

As shown in FIG. 17, the upper plate 220 and the bottom plate 230 are formed with a step 226 and a step 236, respectively. The step 226 and the step 236 project into the accommodation portion 270 from the upper plate 220 and the bottom plate 230, respectively.

As shown in FIG. 5, the first member 210 further has a front plate 250 and a rear plate 260. The front plate 250 and the rear plate 260 are located at opposite ends of the housing 200 in the X-direction, respectively. In detail, the front plate 250 is formed at a front end, or the negative X-side end, of the housing 200, and the rear plate 260 is formed at a rear end, or the positive X-side end, of the housing 200. The front plate 250 blocks a front end of the accommodation portion 270. The rear plate 260 is formed with a connection hole 262. The connection hole 262 is formed so as to cut out the rear plate 260 from the negative Y-side thereof.

Figure 18:
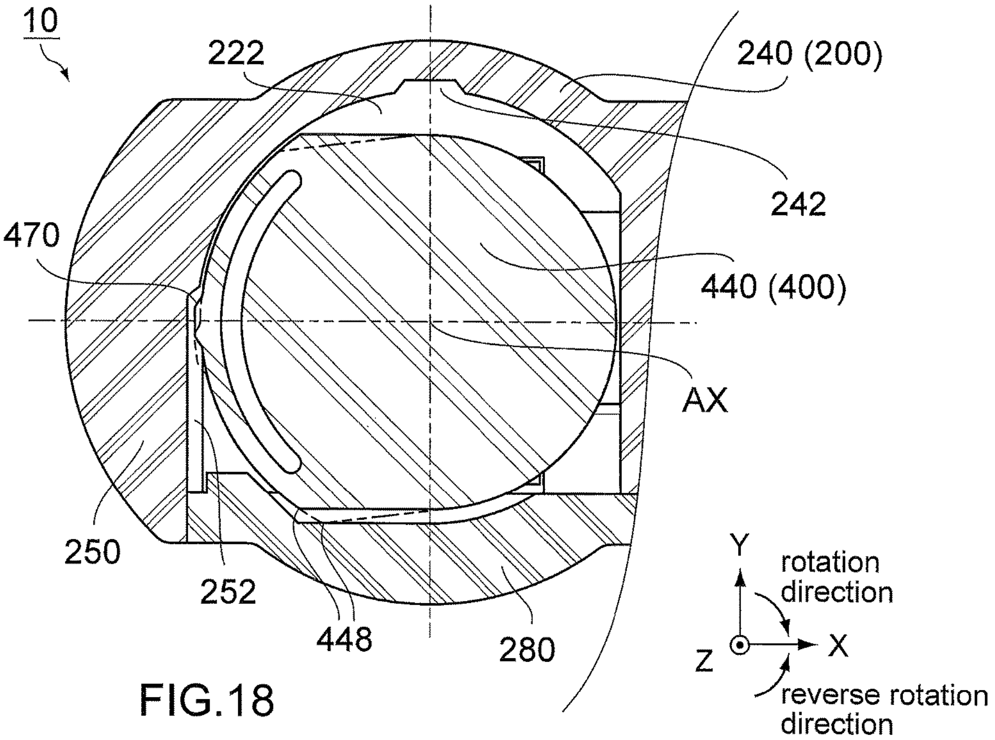
FIG. 18 is a cross-sectional view showing the connector of FIG. 17, taken along line XVIII-XVIII.

As shown in FIG. 18, the housing 200 is provided with a depression 242 and a recess 252. The depression 242 and the recess 252 together with the support hole 222 form a section for accommodating a part of the operation member 400. In detail, the side plate 240 has an inner wall which is partially depressed in the positive Y-direction so as to form the depression 242. The front plate 250 has an inner wall which is partially recessed forward so as to form the recess 252. The depression 242 and the recess 252 according to the present embodiment have shapes different from each other. However, the depression 242 and the recess 252 may have shapes similar to each other.

Figure 13:
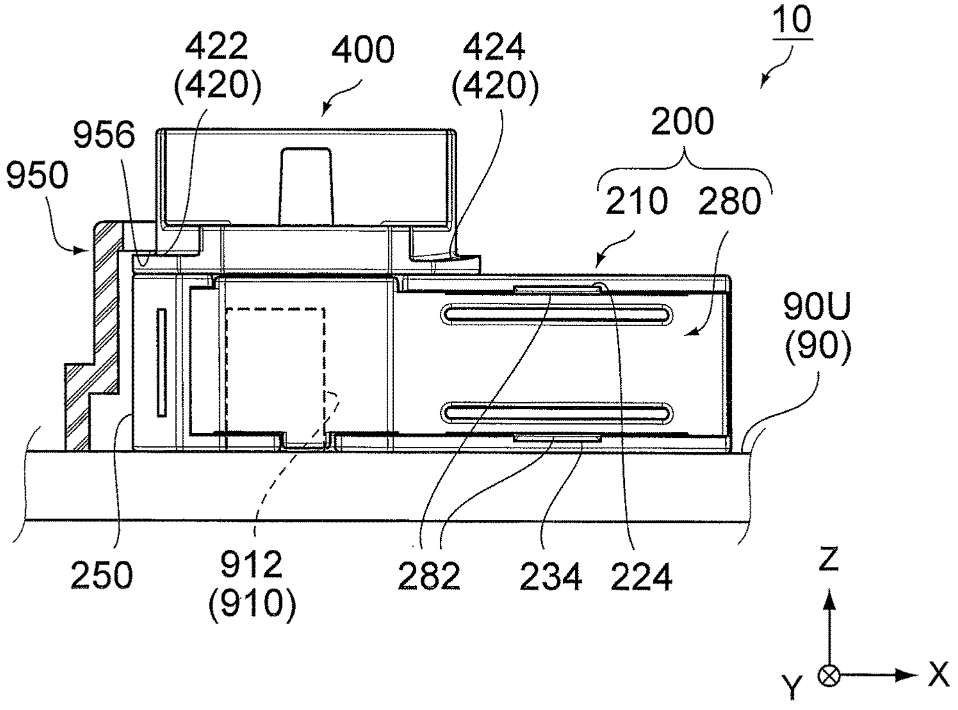
FIG. 13 is a side view showing the connector and the mating structure of FIG. 12, wherein the mating structure is indicated by a cross-section of a lock housing taken along line XIII-XIII and a schematic shape of a hidden pin contact.

As shown in FIGS. 5 and 13, the second member 280 has a plate-like shape extending roughly in the XZ-plane. The second member 280 is formed with two engagement projections 282. The engagement projections 282 have shapes corresponding to those of the engagement hole 224 and the engagement hole 234, respectively. More specifically, each of the engagement projections 282 projects outward in the Z-direction while extending long in the X-direction.

As can be seen from FIGS. 5 and 17, the contact 300 according to the present embodiment has a body portion 310 and a connection portion 330 which are integrally formed.

The body portion 310 has a shape which is a combination of a half column and a square column. The body portion 310 is formed with a receiving portion 320. The receiving portion 320 is a columnar hole piercing the body portion 310 in the Z-direction. The receiving portion 320 is formed with an inner wall 322.

The connection portion 330 has a columnar shape extending rearward from a rear end of the body portion 310. The connection portion 330 is connected to a cable 800. The cable 800 extends in the X-direction, or in a direction perpendicular to the Z-direction. The contact 300 can receive electric power from a power source (not shown) via the cable 800. The contact 300 is securely connected to the cable 800 by crimping a crimping member 850 at a connection section between the connection portion 330 and the cable 800.

As shown in FIG. 17, a contact member 340 made of metal is attached to the inner wall 322 of the receiving portion 320. The contact member 340 roughly has an annular shape. The contact member 340 has a middle portion in the Z-direction which has a circular shape smaller than opposite ends of the contact member 340 in the Z-direction. In detail, in the XY-plane, an inner diameter of the middle portion of the contact member 340 is smaller than a diameter the contact portion 912 (see FIG. 3) of the pin contact 910. On the other hand, an inner diameter of each of the opposite ends of the contact member 340 is larger than the diameter of the contact portion 912. In addition, the middle portion of the contact member 340 is resiliently deformable in the XY-plane.

As can be seen from FIGS. 5 and 17, the contact 300, which is formed as described above and is connected to the cable 800, is inserted into the accommodation portion 270 of the first member 210 along the positive Y-direction and accommodated therein. The contact 300, which is accommodated in the accommodation portion 270, is sandwiched between the upper plate 220 and the bottom plate 230 in the Z-direction so that a movement of the contact 300 in the Z-direction is prevented (see FIG. 17). Moreover, the body portion 310 of the contact 300 is sandwiched between the front plate 250 and the steps 226 and 236 in the X-direction so that a movement of the contact 300 in the X-direction is prevented (see FIG. 17).

As can be seen from FIGS. 5 and 13, the second member 280 is attached to the first member 210 along the positive Y-direction after the contact 300 is accommodated in the first member 210. In detail, the two engagement projections 282 are engaged with the engagement hole 224 and the engagement hole 234, respectively, so that the second member 280 is fixed to the first member 210. When the second member 280 is fixed to the first member 210, the contact 300 is sandwiched between the side plate 240 and the second member 280 in the Y-direction so that a movement of the contact 300 in the Y-direction is prevented.

As can be seen from FIGS. 5 and 17, the contact 300 is held at a predetermined position in the accommodation portion 270. The receiving portion 320 of the contact 300 held at the predetermined position is located on the insertion hole 232 of the bottom plate 230. The cable 800 extends to the outside of the housing 200 through the connection hole 262 of the rear plate 260. As described above, the housing 200 according to the present embodiment is fabricated by combining the first member 210 and the second member 280 in a direction perpendicular to the Z-direction. Accordingly, for example, even if the cable 800 is swayed and applies a force in the Z-direction to the contact 300, the contact 300 can be securely held within the accommodation portion 270.

As can be seen from FIGS. 1 and 2, the operation member 400 according to the present embodiment is supported by the housing 200 so as to be rotationally movable along a rotation direction about a pivot axis (AX) in parallel to the Z-direction. According to the present embodiment, when the connector 10 is seen along the negative Z-direction, the rotation direction is a clockwise direction. However, the operation member 400 can be formed so as to be rotationally movable in a counterclockwise direction.

Figure 6:
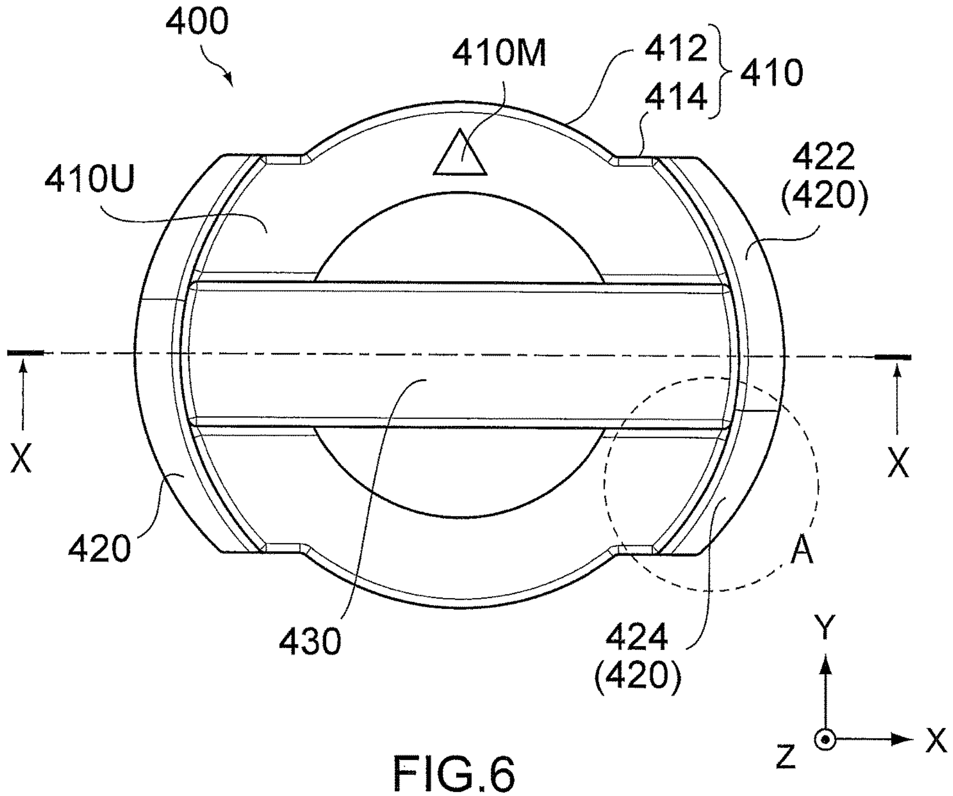
FIG. 6 is a top view showing the operation member of the connector of FIG. 5.
Figure 7:
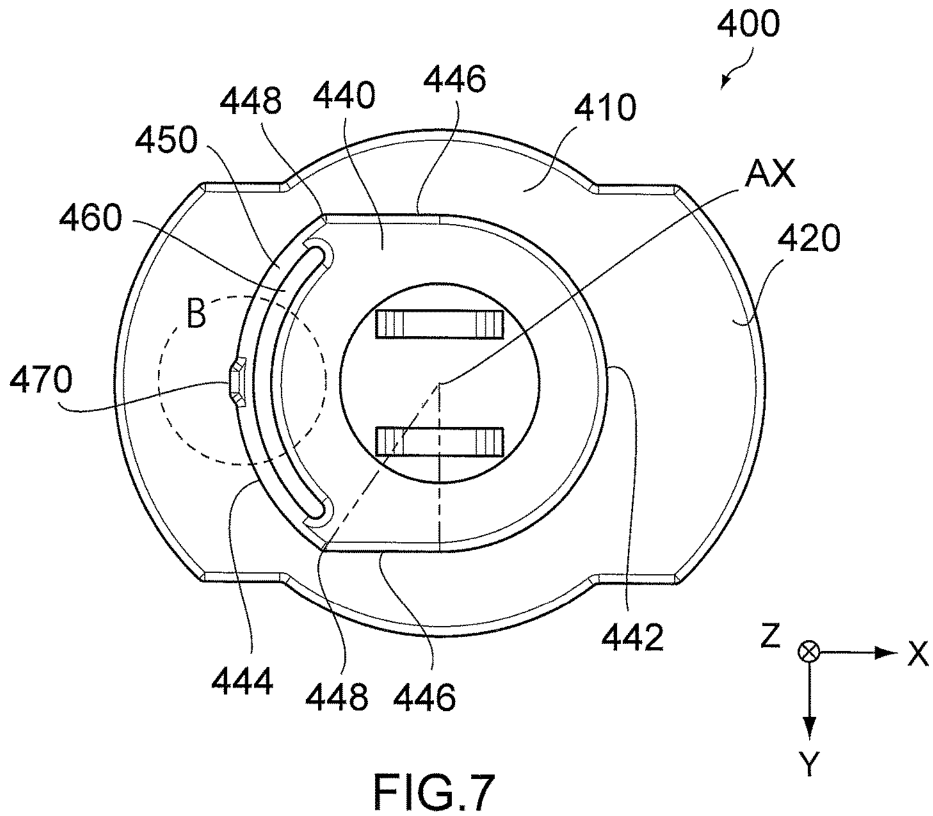
FIG. 7 is a bottom view showing the operation member of FIG. 6.

As shown in FIGS. 5 to 7, the operation member 400 is formed into a disk-like shape as a whole. In detail, the operation member 400 has a pivotable portion 410, two locked portions 420, an operation portion 430 and a lower plate 440.

As shown in FIGS. 5 and 6, the pivotable portion 410 has an upper surface 410U in parallel to the XY-plane. The upper surface 410U is formed with a positioning mark 410M. The positioning mark 410M according to the present embodiment has a triangular shape similar to that of the positioning mark 220M (see FIG. 2). The pivotable portion 410 is formed of a columnar portion 412 of columnar shape and two side portions 414 which project outward in radial directions of the column, or in directions perpendicular to the pivot axis (AX), from the columnar portion 412. The locked portions 420 further project outward in the radial directions from lower ends, or the negative Z-side ends, of the side portions 414, respectively.

Figure 8:
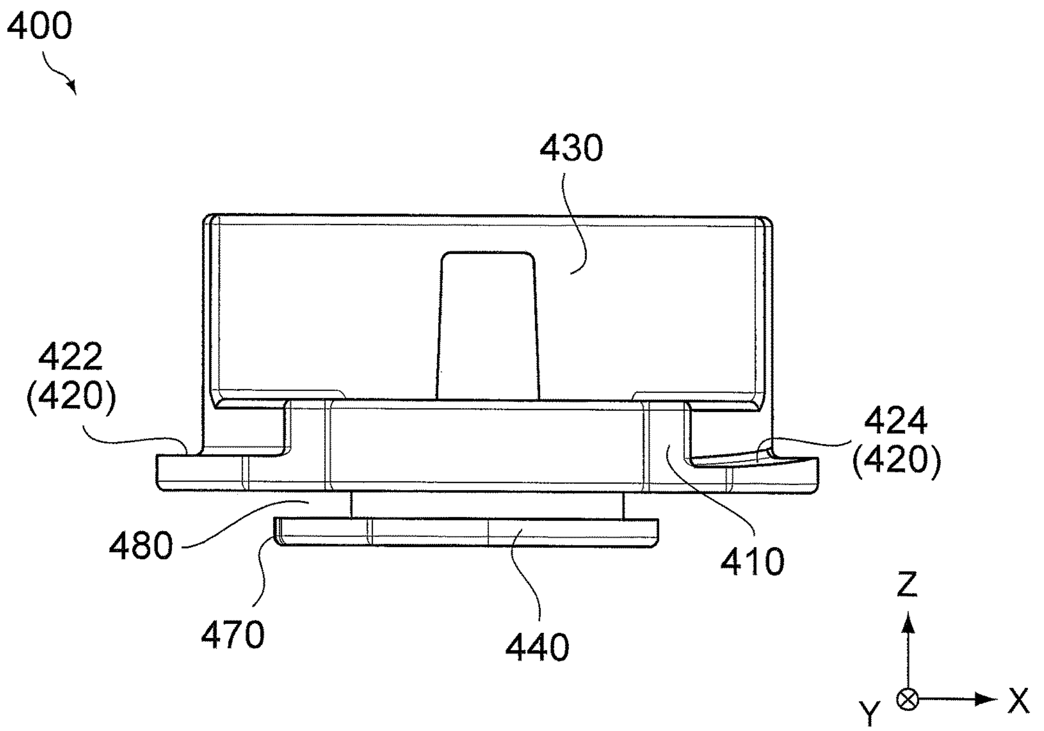
FIG. 8 is a side view showing the operation member of FIG. 6.
Figure 9:
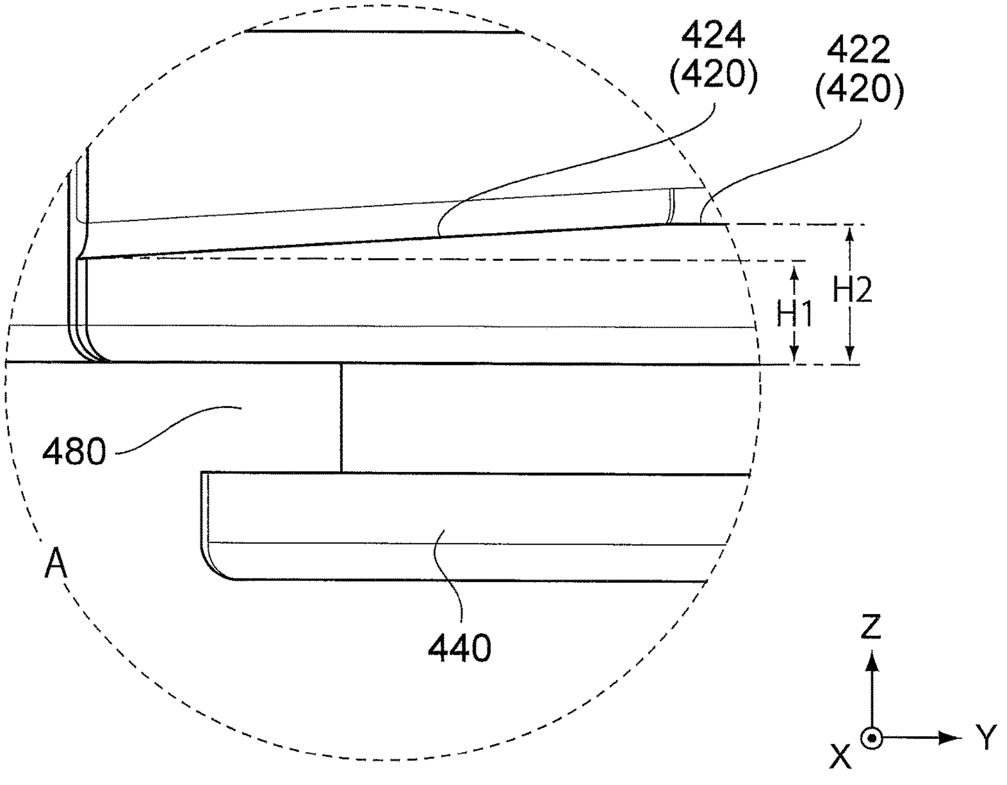
FIG. 9 is an enlarged, side view showing the vicinity of a slope of a locked portion of the operation member (the part enclosed by dashed line A) of FIG. 6.

As shown in FIGS. 6, 8 and 9, each locked portion 420 has an upper side, or an upper surface, which extends to intersect with the Z-direction. In detail, the upper side of the locked portion 420 is formed with a planar portion 422 and a slope 424. The planar portion 422 extends in the XY-plane along the rotation direction, or along the side portion 414. The slope 424 extends from the planar portion 422 while sloping downward along the rotation direction. Accordingly, a height (H1), or a size in the Z-direction, of an end of the locked portion 420 in the rotation direction is smaller than another height (H2) of a portion of the locked portion 420 which is formed with the planar portion 422 (see FIG. 9). In other words, the end of the slope 424 in the rotation direction is located below the planar portion 422.

Figure 10:
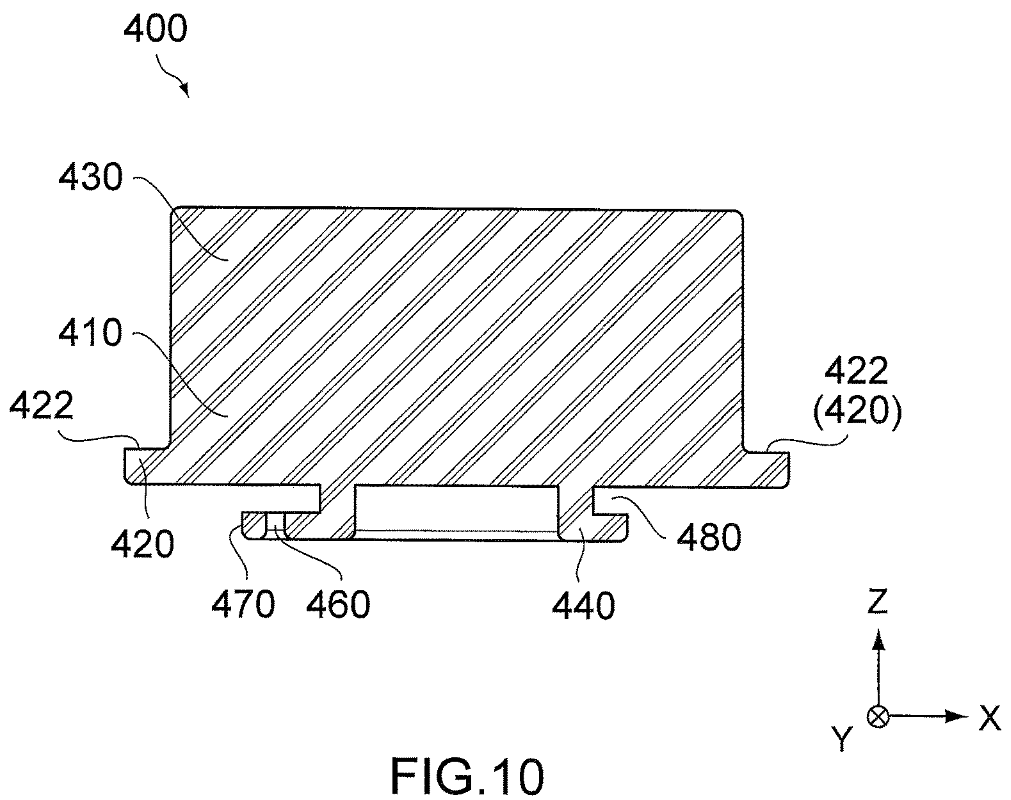
FIG. 10 is a cross-sectional view showing the operation member of FIG. 6, taken along line X-X.

As shown in FIGS. 7, 8 and 10, the lower plate 440 is formed under the pivotable portion 410 with a distance from the pivotable portion 410. The pivotable portion 410 and the lower plate 440 are coupled to each other in the Z-direction by a columnar portion smaller than the pivotable portion 410 and the lower plate 440 so that the operation member 400 is formed with a recess 480. The recess 480 is located between the pivotable portion 410 and the lower plate 440 in the Z-direction.

As shown in FIG. 7, the lower plate 440 has a first arcuate portion 442, a second arcuate portion 444 and two tangential portions 446. According to the present embodiment, the first arcuate portion 442 has a semicircular shape in the XY-plane, and the second arcuate portion 444 has an arc shape in the XY-plane. A size of an imaginary circle having the second arcuate portion 444 as its part is larger than another size of another imaginary circle having the first arcuate portion 442 as its part. The tangential portions 446 couple the first arcuate portion 442 and the second arcuate portion 444 to each other. The second arcuate portion 444 and the tangential portions 446 has connection portions therebetween each of which is formed with a corner 448. In other words, the lower plate 440 has two of the corners 448.

The center of the semicircle of the first arcuate portion 442 is located on the pivot axis (AX) of the operation member 400. Similarly, the center of the arc of the second arcuate portion 444 is located on the pivot axis (AX) of the operation member 400. Accordingly, when the operation member 400 pivots, the first arcuate portion 442 and the second arcuate portions 444 pivot about the pivot axis (AX).

Figure 11:
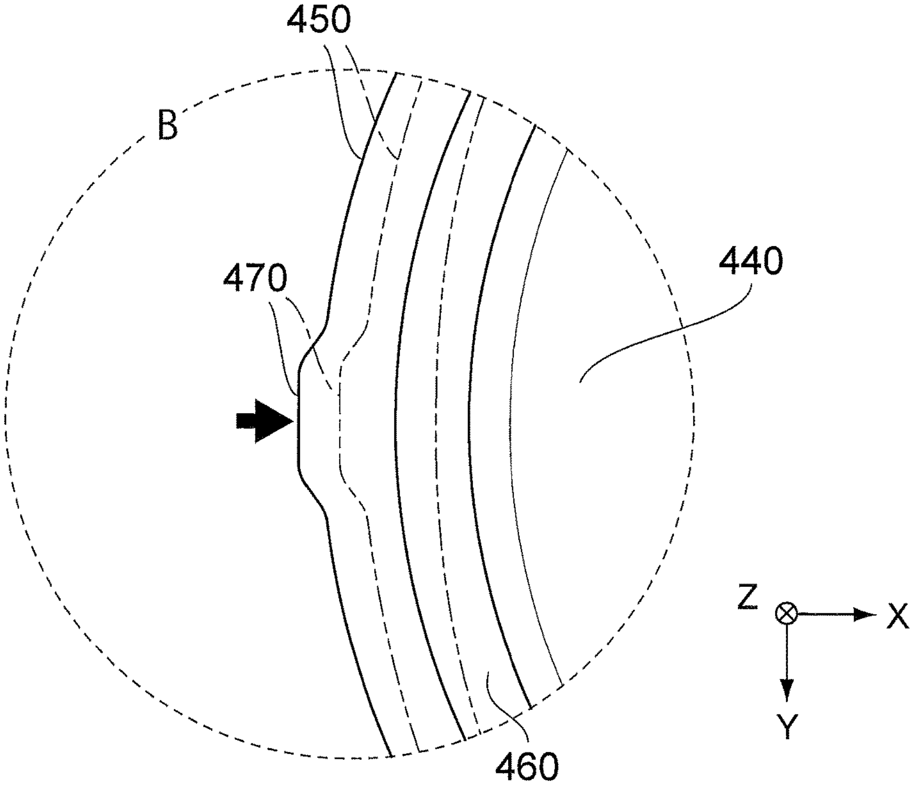
FIG. 11 is an enlarged, bottom view showing the vicinity of a projection of the operation member (the part enclosed by dashed line B) of FIG. 7.

As shown in FIGS. 7, 10 and 11, the lower plate 440 is formed with a groove 460 which pierces the lower plate 440 in the Z-direction. The groove 460 extends along the second arcuate portion 444 in the vicinity of the second arcuate portion 444 so that the lower plate 440 is formed with a support portion 450. The support portion 450 is an arc-shaped, narrow portion which extends long along the groove 460. The thus-formed support portion 450 is resiliently deformable toward the groove 460.

The operation member 400, namely, the lower plate 440, is provided with a projection (maintaining member) 470 which projects in the radial direction. The projection 470 is formed at the middle of the support portion 450. The projection 470 is supported by the support portion 450 so as to be movable in the radial direction, in particular toward the center of the arc of the second arcuate portion 444.

As can be seen from FIGS. 5, 8 and 17, the operation member 400 is attached to the first member 210 of the housing 200 so that the projection 470 is located at a front end of the lower plate 440. In detail, the operation member 400 is attached to the support hole 222 so that the upper plate 220 of the first member 210 and the recess 480 of the operation member 400 are engaged with each other. By this engagement, movements of the operation member 400 in the X-direction and in the Z-direction are prevented. Moreover, the second member 280 is fixed to the first member 210 as described above after the contact 300 and the operation member 400 are both attached to the first member 210. When the second member 280 is fixed to the first member 210, a movement of the operation member 400 in the Y-direction is prevented. As a result, the operation member 400 is practically only allowed to pivot about the pivot axis (AX).

Figure 12:
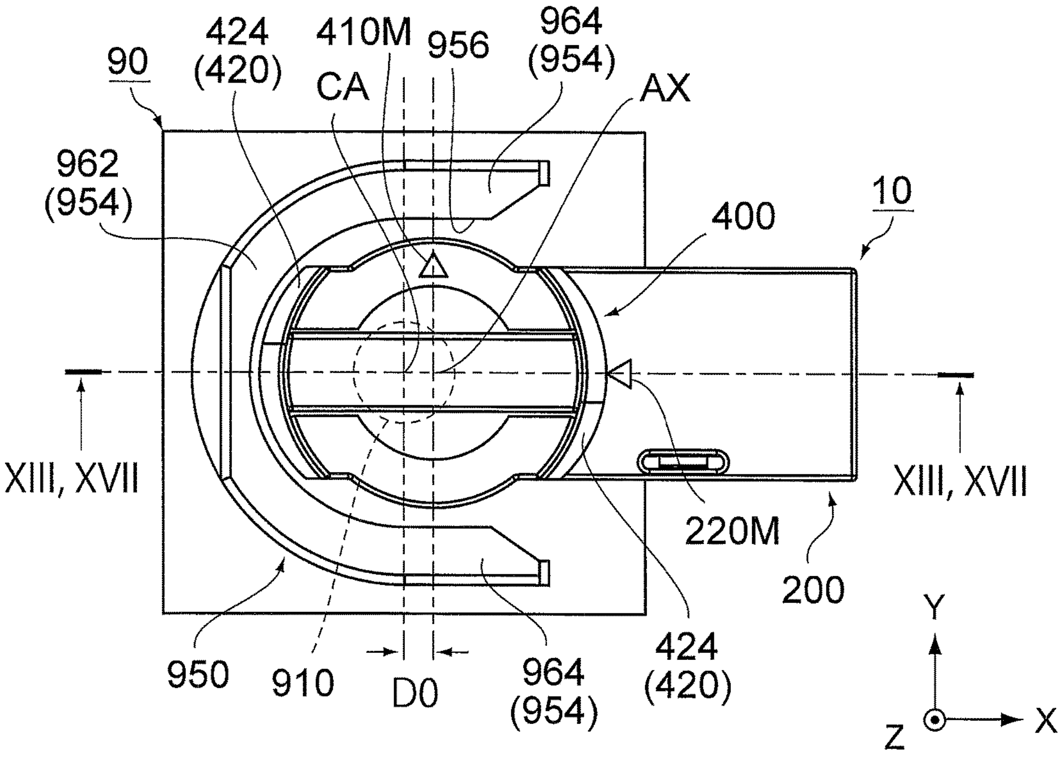
FIG. 12 is a top view showing the connector and the mating structure of FIG. 1, wherein a cable connected to the connector is not illustrated.

As shown in FIGS. 2, 12 and 13, when the connector 10 is fabricated as described above, the locked portions 420 of the operation member 400 are located over the housing 200. Moreover, the locked portions 420 are located in territory of the housing 200 in the XY-plane. The position of the operation member 400 at that time, or the position of the operation member 400 illustrated in FIGS. 2, 12 and 13, is referred to as "release position". The locked portions 420 of the operation member 400 at the release position do not protrude from the housing 200 in the XY-plane.

The connector 10 explained above is mateable with and removable from the mating structure 90 as described below.

As can be seen from FIG. 12, when the operation member 400 is located at the release position, the connector 10 can be mated with and can be removed from the mating structure 90 along the Z-direction with no interference by the lock housing 950. In detail, the locked portions 420 of the operation member 400 at the release position does not prevent the connector 10 from being mated with the mating structure 90. Moreover, the locked portions 420 of the operation member 400 at the release position does not prevent the connector 10 from being removed from the mating structure 90. In other words, the locked portions 420 allow the connector 10 to be moved to the mated state with the mating structure 90 and to be removed from the mating structure 90 when the operation member 400 is located at the release position.

As can be seen from FIGS. 13 and 17, when the connector 10 and the mating structure 90 is in the mated state, the contact portion 912 (see FIG. 13) of the pin contact 910 is inserted into the receiving portion 320 of the contact 300 through the insertion hole 232 of the housing 200. In detail, the contact portion 912 is inserted into the contact member 340 of the contact 300 to be in contact with the contact member 340. In other words, the contact 300 is held by the housing 200 so as to be brought into contact with the pin contact 910 under the mated state. As can be seen from the above explanation, the connector 10 and the mating structure 90 are electrically connected with each other under the mated state.

As shown in FIG. 13, the locked portions 420 of the operation member 400 are located above the pin contact 910 under the mated state. In other words, a height of the contact portion 912 of the pin contact 910 according to the present embodiment is lower than another height of the housing 200. Accordingly, electric shock due to contact with the pin contact 910 can be prevented more effectively.

As shown in FIG. 18, when the operation member 400 is located at the release position, the projection 470 of the operation member 400 is located within the recess 252 of the housing 200 and, therefore, projects forward without being pressed by the front plate 250. According to the present embodiment, the projection 470 of the operation member 400 at the releasing position is apart from the front plate 250. However, a front end of the projection 470 may be in slight contact with the front plate 250.

As can be seen from FIG. 18, if the operation member 400 of the release position starts the rotational movement in the rotation direction, the projection 470 is brought into abutment with the front plate 250. Accordingly, the operation member 400 is prevented from unintentionally rotating along the rotation direction, or from pivoting with no pivoting operation. Moreover, in a case where the recess 252 is formed to have a shape similar to that of the depression 242, the operation member 400 can be also prevented from unintentionally rotating along a reverse rotation direction that is a direction opposite to the rotation direction. As can be seen from the above explanation, the projection 470 according to the present embodiment functions as the maintaining member 470 to maintain the operation member 400 at the release position.

According to the present embodiment, when the operation member 400 of the release position is rotationally moved in the reverse rotation direction, the corner 448 of the operation member 400 is brought into abutment with the second member 280 of the housing 200. Accordingly, the rotational movement of the operation member 400 in the reverse rotation direction is regulated. As can be seen from the above explanation, the operation member 400 according to the present embodiment includes a regulation portion, namely, the corner 448, which regulates the rotational movement in the reverse rotation direction.

Figure 14:
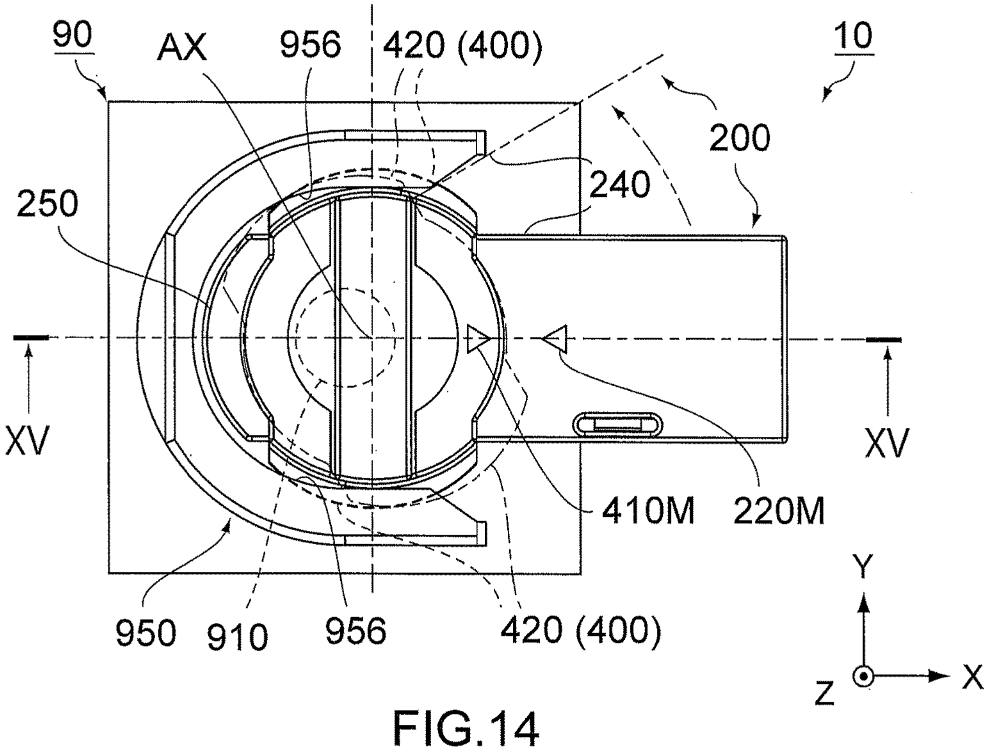
FIG. 14 is a top view showing the connector and the mating structure of FIG. 12 under a state where the operation member is rotationally moved to a lock position.

As shown in FIGS. 1, 12 and 14, when the operation portion 430 of the operation member 400 of the release position is operated to be rotationally moved in the rotation direction, the pivotable portion 410 of the operation member 400 is also rotationally moved in the rotation direction. When the pivotable portion 410 is rotationally moved in the rotation direction, the locked portions 420 of the operation member 400 are moved while gradually projecting from the housing 200 in the XY-plane (see FIG. 14).

As shown in FIG. 12, according to the present embodiment, in the XY-plane, the position of the pivot axis (AX) of the operation member 400 is apart from the center (CA) of the arc of the arcuate portion 962 by a distance DO. Accordingly, the locked portions 420 are moved in the rotation direction while passing under the lock portions 956 of the lock housing 950, respectively. Since the locked portion 420 according to the present embodiment is provided with the slope 424, the locked portion 420 can be moved under the lock portion 956 without being brought into abutment with the lock wall 954 of the lock housing 950 to be stopped.

As can be seen from FIG. 14, as the operation member 400 is rotationally moved in the rotation direction, larger part of the locked portion 420 protrudes under the lock portion 956. According to the present embodiment, when the operation member 400 is rotationally moved by 90° in the rotation direction, the two locked portions 420, similar to each other, largely protrude under the lock portions 956, respectively. The position of the operation member 400 at that time, or the position of the operation member 400 illustrated in FIG. 14, is referred to as "lock position".

The locked portions 420 of the operation member 400 at the lock position protrude from the housing 200 in the XY-plane so that a large area of the locked portion 420 is covered with the lock portion 956 in the Z-direction. Accordingly, when the operation member 400 is located at the lock position, the connector 10 cannot be removed from the mating structure 90 along the Z-direction. Moreover, the connector 10, which is in a state where the operation member 400 is rotationally moved to the lock position, cannot be brought into mating with the mating structure 90.

In other words, the locked portions 420 interfere with the lock housing 950 to prevent the connector 10 from being moved to the mated state with the mating structure 90 and from being removed from the mating structure 90 when the operation member 400 is located at the lock position.

In detail, the locked portions 420 of the operation member 400 at the lock position interfere with the lock portions 956, or are locked by the lock portions 956, respectively, to prevent the connector 10 from being removed from the mating structure 90. Thus, when the operation member 400 of the connector 10 is rotationally moved from the release position to the lock position, the removal of the connector 10, which is mated with the mating structure 90, can be prevented. As a result, unintentional removal of the connector 10 can be more securely prevented. Moreover, the locked portions 420 of the operation member 400 at the lock position prevent the connector 10 from being mated with the mating structure 90.

As shown in FIGS. 12 and 14, according to the present embodiment, the operation member 400 of the release position is moved to the lock position by rotation of 90° in the rotation direction. In other words, according to the present embodiment, a predetermined pivoting angle, which is necessary to rotationally move the operation member 400 from the release position to the lock position, is 90°. The predetermined pivoting angle can be changed to an angle other than 90°, for example, by modifying the structures of the locked portion 420 and the lock portion 956. However, the structure according to the present embodiment is preferable in order to more securely lock the locked portions 420 by the lock portions 956, respectively.

As can be seen from FIG. 14, the connector 10 in the mated state can be rotationally moved about the pin contact 910 in a clockwise direction and in a counterclockwise direction. For example, when the cable 800 (see FIG. 1) connected to the connector 10 is swayed, the connector 10 might pivot. The connector 10 according to the present embodiment can be rotationally moved to a position where the housing 200 is brought into abutment with the lock housing 950. Two-dot chain line in FIG. 14 shows a part of the shape of the connector 10 in a state where the side plate 240 of the housing 200 is brought into abutment with the lock housing 950, wherein the housing 200 is rotationally moved in the counterclockwise direction. According to the present embodiment, even if the connector 10 pivots as described above, the locked portions 420 are locked by the lock portions 956, respectively. In other words, the locked portions 420 according to the present embodiment are formed to prevent the removal of the connector 10 even when the connector 10 pivots about the pin contact 910 in the XY-plane.

Moreover, according to the present embodiment, when the operation member 400 is located at the lock position, the two locked portions 420 are locked evenly by the lock portions 956. Accordingly, the unintentional removal of the connector 10 can be more surely prevented. However, the operation member 400 may be provided three or more of the locked portions 420. In other words, it is sufficient for the operation member 400 according to the present embodiment to be provided with at least two of the locked portions 420. Moreover, by modifying the size and the position of each of the locked portion 420 and the lock portion 956, even only one of the locked portions 420 can prevent the unintentional removal of the connector 10.

Figure 19:
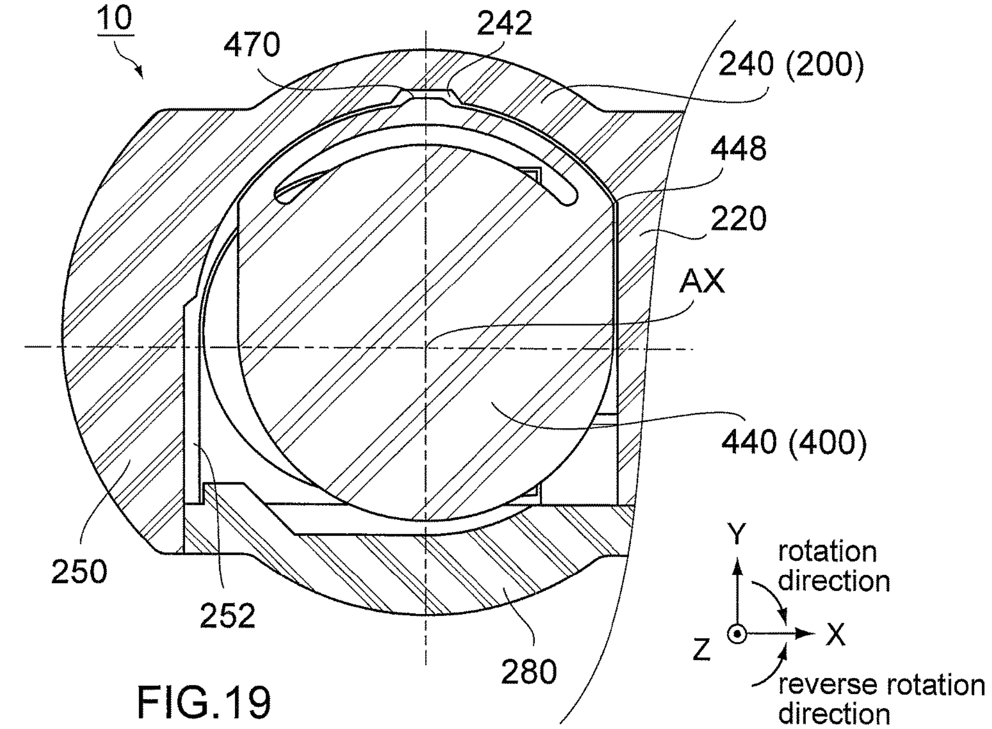
FIG. 19 is a cross-sectional view showing the connector of FIG. 17 under the state where the operation member is rotationally moved to the lock position, taken along line XIX-XIX.
Figure 20A:
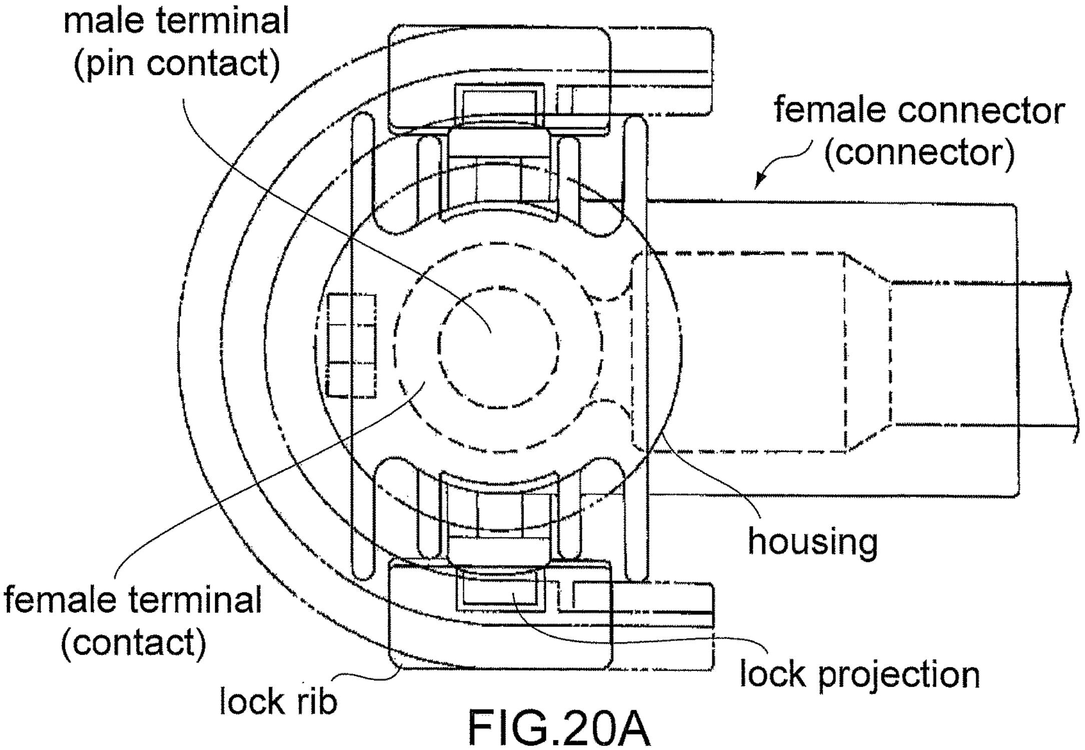
FIG.20A PRIOR ART
FIG. 20A is a top view showing an existing connector and a mating connector, wherein a part of the connector, which is hidden under the mating connector, is also illustrated.
Figure 20B:
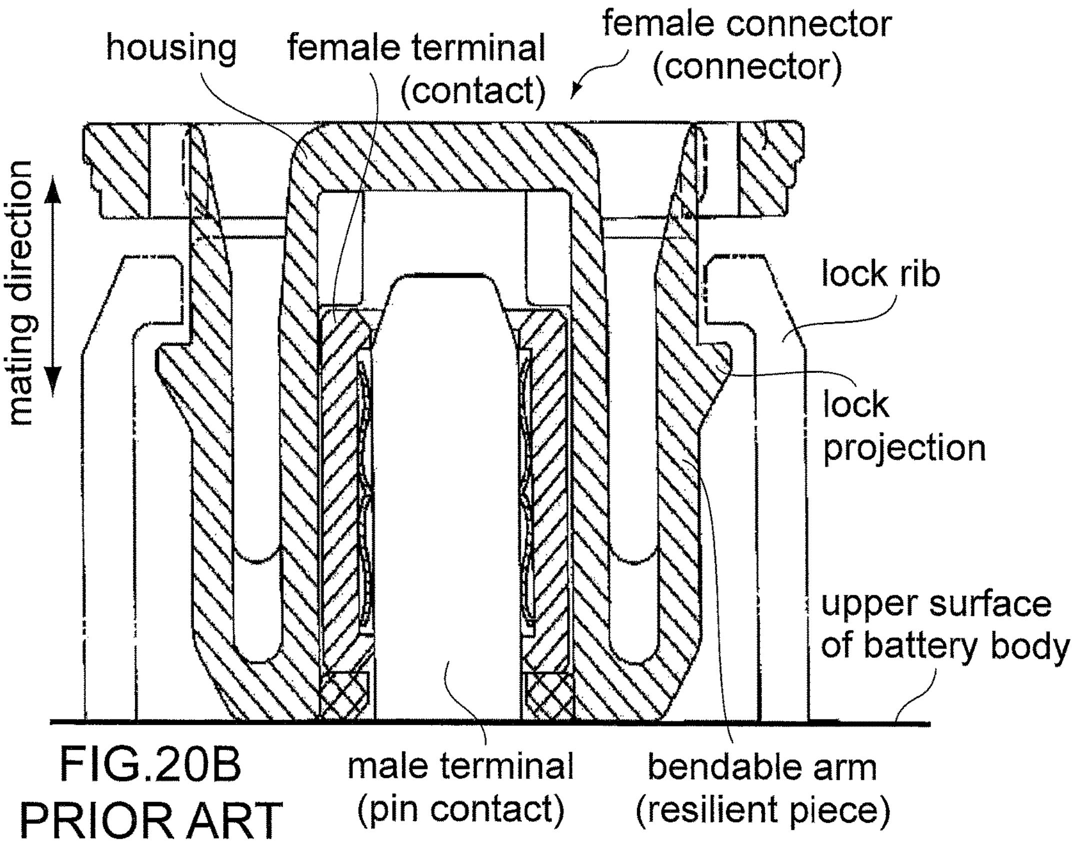
FIG.20B PRIOR ART
FIG. 20B is a cross-sectional view showing the connector and the mating connector of FIG. 20A.

As can be seen from FIGS. 18 and 19, when the operation member 400 is operated to pivot and starts to be rotationally moved from the release position (see FIG. 18) toward the lock position (see FIG. 19), the projection 470 is pressed by the front plate 250 of the housing 200 to be moved inward in the radial direction. When the operation member 400 is moved to the lock position, the projection 470 is located in the depression 242 to be moved outward in the radial direction. At that time, an operator of the operation member 400 can obtain a click feeling which enables the operator to recognize that the operation member 400 just reaches the lock position.

As can be seen from FIG. 19, when the operation member 400 of the lock position starts to be rotationally moved in the reverse rotation direction, the projection 470 is brought into abutment with an edge of the depression 242. Accordingly, the operation member 400 is prevented from unintentionally rotating along the reverse rotation direction, or from pivoting with no pivoting operation. As can be seen from the above description, the projection 470 according to the present embodiment also functions as the maintaining member 470 to maintain the operation member 400 at the lock position. In other words, the connector 10 according to the present embodiment includes the projection 470 which is the maintaining member to maintain the operation member 400 at each of the release position and the lock position. However, the maintaining member can be formed of a component other than the projection 470.

When the operation member 400 of the lock position is further moved rotationally in the rotation direction, the corner 448 of the operation member 400 is brought into abutment with the housing 200. Accordingly, a rotation movement of the operation member 400 in the rotation direction is regulated. As can be seen from the above explanation, the operation member 400 according to the present embodiment includes another regulation portion, namely, the corner 448, which regulates excessive rotation in the rotation direction. Thus, the operation member 400 according to the present embodiment can be rotationally moved from the release position just to the lock position along the rotation direction.

Figure 16:
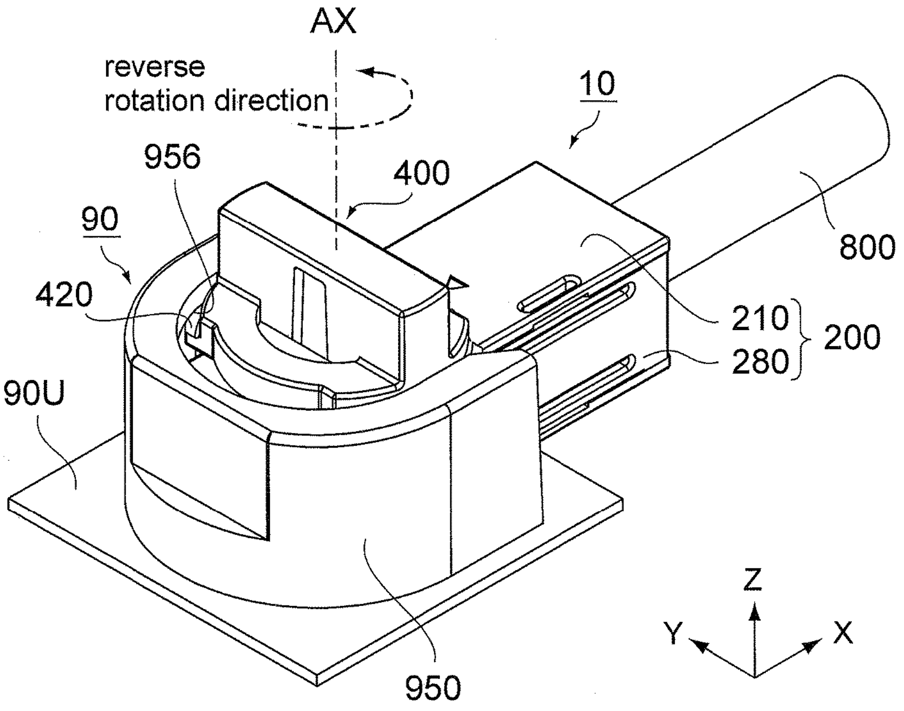
FIG. 16 is a perspective view showing the connector and the mating structure of FIG. 1 under the state where the operation member is rotationally moved to the lock position.

As can be seen FIGS. 14, 16 and 19, the operation portion 430 of the operation member 400 of the lock position can be operated to be rotationally moved in the reverse rotation direction. When the operation portion 430 is operated to be rotationally moved in the reverse rotation direction, the projection 470 is pressed by the front plate 250 of the housing 200 to be moved inward in the radial direction (see FIG. 19). When the operation member 400 is moved to the release position, the projection 470 is located in the recess 252 to be moved outward in the radial direction. At that time, the operator of the operation member 400 can obtain a click feeling which enables the operator to recognize that the operation member 400 just reaches to the release position. As can be seen from the above explanation, the operation member 400 can be rotationally moved just between the release position and the lock position.

As shown in FIGS. 12 and 14, when the operation member 400 is located at the release position, the positioning mark 410M of the operation member 400 is located apart from the positioning mark 220M of the housing 200 along the rotation direction. According to the present embodiment, the positioning mark 410M and the positioning mark 220M are separated by 90° along the rotation direction. Accordingly, when the operation member 400 is located at the lock position, the positioning mark 410M faces the positioning mark 220M in the X-direction. According to the present embodiment, the positional relation between the positioning mark 410M and the positioning mark 220M enables recognition about the position of the operation member 400. In particular, according to the present embodiment, facing corners of the positioning mark 410M and the positioning mark 220M enable recognition that the operation member 400 is located at the lock position. However, each of the positioning mark 410M and the positioning mark 220M may have a shape different from that of the present embodiment.

Although the specific explanation about the embodiment of the present invention is made above, the connector according to the present invention is not limited to the above described embodiment but can be variously modified.

For example, the present invention can be applied to also a connector other than the cable connector. Moreover, the lock housing of the mating structure may be formed in a shape different from that of the aforementioned embodiment. For example, the arcuate portion of the lock housing may be provided so as to be a large distance from the front end of the connector in the mated state. Moreover, the arcuate portion may have, for example, one-third circle shape. In this case, the position of the pivot axis of the operating member may be same as that of the center of the arc of the arcuate portion. Moreover, the arcuate portion may be formed of a plurality of unconnected arcuate portions, or may be formed of a plurality of linear portions to have a shape similar to an arc. Moreover, the lock housing can be provided with no arcuate portion.

The present application is based on a Japanese patent application of JP2012-249661 filed before the Japan Patent Office on Nov. 13, 2012, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10 connector
200 housing
210 first member
220 upper plate
220U upper surface
220M positioning mark
222 support hole
224 engagement hole
226 step
230 bottom plate
232 insertion hole
234 engagement hole
236 step
240 side plate
242 depression
250 front plate
252 recess
260 rear plate
262 connection hole
270 accommodation portion
280 second member
282 engagement projection
300 contact
310 body portion
320 receiving portion
322 inner wall
330 connection portion
340 contact member
400 operation member
410 pivotable portion
410U upper surface
410M positioning mark
412 columnar portion
414 side portion
420 locked portion
422 planar portion
424 slope
430 operation portion
440 lower plate
442 first arcuate portion
444 second arcuate portion
446 tangential portion
448 corner
450 support portion
460 groove
470 projection (maintaining member)
480 recess
AX pivot axis
800 cable
850 crimping member
90 mating structure
90U upper surface
92 holding hole
910 pin contact
912 contact portion
914 held portion
916 connection portion
950 lock housing
952 sidewall
954 lock wall
956 lock portion
962 arcuate portion
964 linear portion
CA center
CP center

The invention claimed is:

1. A connector mateable with and removable from a mating structure along an upper-lower direction, the mating structure having an upper surface and comprising a pin contact and a lock housing which extend upward along the upper-lower direction from the upper surface, the connector comprising a housing, a contact and an operation member, wherein:

the contact is held by the housing, the contact being brought into contact with the pin contact under a mated state where the connector and the mating structure are mated with each other;

the operation member is formed separately from the housing and supported by the housing, the operation member being rotationally movable between a release position and a lock position about a pivot axis which is in parallel to the upper-lower direction, the operation member being provided with a locked portion projecting in a radial direction perpendicular to the pivot axis, the locked portion allowing the connector to be moved to the mated state with the mating structure and to be removed from the mating structure when the operation member is located at the release position, the locked portion interfering with the lock housing when the operation member is located at the lock position, so that the locked portion prevents the connector from being moved to the mated state with the mating structure and from being removed from the mating structure; and wherein in a plane perpendicular to the upper-lower direction, the locked portion of the operation member at the lock position protrudes from the housing while the locked portion of the operation member at the release position does not protrude from the housing.

2. The connector as recited in claim 1, wherein the operation member is provided with at least two of the locked portions.

3. The connector as recited in claim 1, wherein:

the lock housing includes an arcuate portion, the arcuate portion having an arc shape in a plane perpendicular to the upper-lower direction; and under the mated state, a position of the pivot axis of the operation member in a plane perpendicular to the upper-lower direction is apart from a center of an arc of the arcuate portion in a plane perpendicular to the upper-lower direction.

4. The connector as recited in claim 1, wherein:

the operation member is rotationally movable from the release position to the lock position along a rotation direction;

the locked portion has a slope which is formed on an upper side thereof in the upper-lower direction; and the slope slopes downward along the rotation direction.

5. The connector as recited in claim 1, wherein the locked portion is located above the housing.

6. The connector as recited in claim 1, wherein the locked portion is located above the pin contact under the mated state.

7. The connector as recited in claim 1, wherein:

the housing has a first member and a second member;

the first member has an upper plate, a bottom plate and a side plate, the upper plate and the bottom plate being located at opposite ends of the first member in the upper-lower direction, respectively, the side plate coupling the upper plate and the bottom plate to each other in the upper-lower direction, the first member being formed with an accommodation portion to accommodate the contact, the accommodation portion being formed of the upper plate, the bottom plate and the side plate; and the second member is attached to the first member along a width direction perpendicular to the upper-lower direction.

8. The connector as recited in claim 1, wherein the connector includes a maintaining member to maintain the operation member at each of the release position and the lock position.

9. The connector as recited in claim 8, wherein:

the operation member is provided with a projection which projects in the radial direction; and the projection is supported to be movable in the radial direction and functions as the maintaining member.

* * * * *